United States Patent [19]

Miller

[11] 4,086,495

[45] Apr. 25, 1978

[54] AUTOMATIC CAPACITOR WINDING MACHINE

[75] Inventor: Fredric S. Miller, Wayne, N.J.

[73] Assignee: Universal Manufacturing Corporation, Bridgeport, Conn.

[21] Appl. No.: 758,531

[22] Filed: Jan. 11, 1977

Related U.S. Application Data

[62] Division of Ser. No. 562,011, Mar. 25, 1975, Pat. No. 4,020,727.

[51] Int. Cl.[2] .............................................. G01N 21/30

[52] U.S. Cl. .................................. 250/561; 250/223 B

[58] Field of Search .................. 250/561, 231 SE, 221, 250/222, 223 R, 223 B; 324/175; 356/196

[56] References Cited

U.S. PATENT DOCUMENTS

| | | | |
|---|---|---|---|
| 3,351,198 | 11/1967 | Wyman | 356/240 |
| 3,604,940 | 9/1971 | Matthews | 250/222 X |

*Primary Examiner*—David C. Nelms
*Assistant Examiner*—Vincent J. Sunderdick
*Attorney, Agent, or Firm*—Darby & Darby

[57] ABSTRACT

An automatic capacitor winding machine including a photoelectric device for sensing the position of a capacitor tab which is rotated by a rotating arbor is disclosed. The sensing device is characterized by a light source providing a light-beam directed along a line which lies in a plane perpendicular to the axis of rotation of the arbor. The tab crosses the line along which the light-beam is directed only twice. The width of the light-beam is greater than the width of the tab at the line crossing nearest the light source. A photoelectric detector is positioned to receive light directed along the line and it is responsive to light impinging thereon. The detector has an angle of light acceptance such that the light-beam is prevented from impinging on the detector only when the tab is at the line crossing which is nearest to the light detector.

This abstract is not to be taken either as a complete exposition or as a limitation of the present invention. However, the full nature and extent of the invention is discernible only by reference to and from the entire disclosure.

4 Claims, 16 Drawing Figures

AUTOMATIC CAPACITOR WINDING MACHINE

This is a division, of application Ser. No. 562,011, filed Mar. 25, 1975 now U.S. Pat. No. 4,020,727.

BACKGROUND OF THE INVENTION

The invention pertains to improvements to machinery to wind capacitors, and particularly those capacitors which incorporate more than one capacitor in the same winding. Machines have heretofore been designed to wind capacitors of this type. In particular, one prior art machine has met considerable commercial success. That machine, the semi-automatic Hilton Capacitor Winding Machine, manufactured by Hilton Industries, Inc., Glen Falls, New York, provided a partial answer to the industry's need for a capacitor winding machine. Specifically, this machine incorporated means for supplying the necessary dielectric layers, foil, and terminals to an arbor which was winding the capacitor. The machine automatically fed the proper lengths of foil to form the various capacitor electrode and, at approximately the proper time, fed foils with metallic tabs which formed the terminals of the capacitor.

Unfortunately, this machine, despite some automatic operations, required the full-time attendance of an operator. Among the functions that this operator had to perform were threading the severed ends of the dielectric layers onto the arbor to allow the machine to wind another capacitor, sealing the ends of the wound capacitor to prevent it from unraveling, and removing the wound capacitor from the arbor. The operator also had to reorient the capacitor tabs so that they assumed the proper angular relationship, and, when the finished capacitors tended to collapse, manually insert a structural reinforcement at the beginning of the winding of the succeeding capacitors.

Beside the cost of the labor necessitated by this machine, manual operations are subject to human error. Therefore, it has been a long-standing goal in the capacitor winding industry to reduce the amount of manual labor needed to produce wound capacitors.

Prior attempts to design an automatic capacitor winding machine have not met with commercial success. These attempts have encountered numerous problems.

One major problem is automatically removing the wound capacitor from the winding arbor without telescoping of the capacitor, i.e. the inner windings of the capacitor body pulling out of and extending past the main body of the capacitor. This problem seems to be caused by the friction between the innermost winding and the arbor, which tends to keep the innermost winding on the arbor. Unfortunately, normal lubrication techniques (oil, grease) cannot be used to reduce the friction since they would degrade the capacitor. Attempts to strip the capacitor off the arbor by close tolerance strippers have previously failed because of the wear suffered by these parts, destroying the tolerances.

Another problem left unsolved by the prior art machines is automatically preventing the collapse of the capacitor when stripped off the arbor. In the semi-automatic machines, structural inserts were manually fed into the capacitor. However, in automating the machine, prior attempts have not been successful in designing an automatic structural insert device.

Another problem is to insert the tabs (terminals) of the capacitor in the proper angular relation. This requires that the machine know the exact angular position of the first tab, so that later tabs can be properly inserted. Prior art machines attempted to solve this problem by counting arbor rotations. However, this system has proved expensive and unreliable.

Moreover, most prior art attempts to design an automatic capacitor winding machine have involved designing a machine from scratch. This has resulted in expensive, complicated, and unreliable machines. The present invention can be used to modify prior art machines, and in fact, such a modification is the preferred embodiment of the present invention.

Consequently, it is an object of the present invention to attain an automatic capacitor winding machine, preferably in a form that permits modification of prior art semi-automatic machines.

It is also an object of the invention to obtain a mechanism to strip capacitors off arbors without capacitor telescoping and with minimum stripper wear.

It is also an object of this invention to obtain a machine that knows the position of a tab inserted into a capacitor without counting arbor rotations.

Another object of this invention is to obtain an automatic structural insert means, preferably constructed to fit within the confines of the prior art semi-automatic machines.

The present invention has met the above and other objects. Although the features of the present invention are embodied in a specific automatic capacitor winding machine, from the below description, one skilled in the art will be able to embody these features into other environments, not limited to capacitor winding machines.

SUMMARY OF THE INVENTION

The preferred embodiment of the present invention comprises a capacitor winding machine with a bifurcated arbor. Lateral transport means are provided for moving the bifurcated arbor axially from an advanced position to a retracted position. Additionally, rotational motor means are provided which rotate the bifurcated arbor about its axis to wind upon the arbor the various layers comprising a wound capacitor.

Appropriately located on the face of the capacitor winding machine are continuous rolls of the supplies necessary to form the capacitor. Thus, there are continuous rolls of the paper which form the capacitor dielectric layers. There are also continuous rolls of metallic foil which form the capacitor electrodes. Also, there are continuous metallic foil rolls with tabs periodically bonded thereto which are inserted to become the tabs (terminals) of the completed capacitor.

The preferred embodiment of the invention also has means to supply a structural insert for the capacitor. This structural insert is preferably located at the beginning of the second capacitor section, and functions to prevent the collapse of the capacitor after its removal from the bifurcated arbor. This automatic structural insert means, not found on the prior art machines, in the preferred embodiment is of a form that enables it to be incorporated in the limited remaining space on prior art machines.

Similarly, transport means are provided. These transport means carry the ends of the dielectric layers forming the capacitor in front of the bifurcated arbor when it is in its retracted position. Registering means are provided to index said bifurcated arbor with its slot in the direction parallel to the plane of the dielectric layers in front of the bifurcated arbor prior to the bifurcated arbor moving from its retracted position to its advanced position.

Stripper means are provided to remove the wound capacitor from the bifurcated arbor. These means are particularly adapted to prevent the capacitor during the stripping process from telescoping, i.e., to prevent the inner wound layers of the capacitor from extending beyond the body of the capacitor.

The present invention also inserts the capacitor tabs (terminals) into the capacitor as it is being wound so that in the completed capacitor the tabs have a predetermined angular relationship with respect to each other. These means include photoelectric means which accurately senses the angular location of the first tab previously inserted into the capacitor.

Generally speaking, the objectives of the present invention are attained by the provision of a photoelectric device for sensing when an object which travels a predefined path and which crosses a line a plurality of times is at a first point of crossing on the path which is nearest a first end of the line comprising, a light detector having a relatively narrow angle of light acceptance located proximate the first end of the line and responsive to light impinging thereon, and a light source proximate the second end of the line for transmitting a beam of light, which is wider at a point of crossing on the path which is further from the first end of the line than the first point of crossing than the widest portion of the object, along the line, whereby the object prevents the beam from impinging on the detector only when the object is at the first point of crossing on the path closest to the first end of the line.

DETAILED DESCRIPTION OF THE PREFERRED EMBODIMENT

Figure 1:
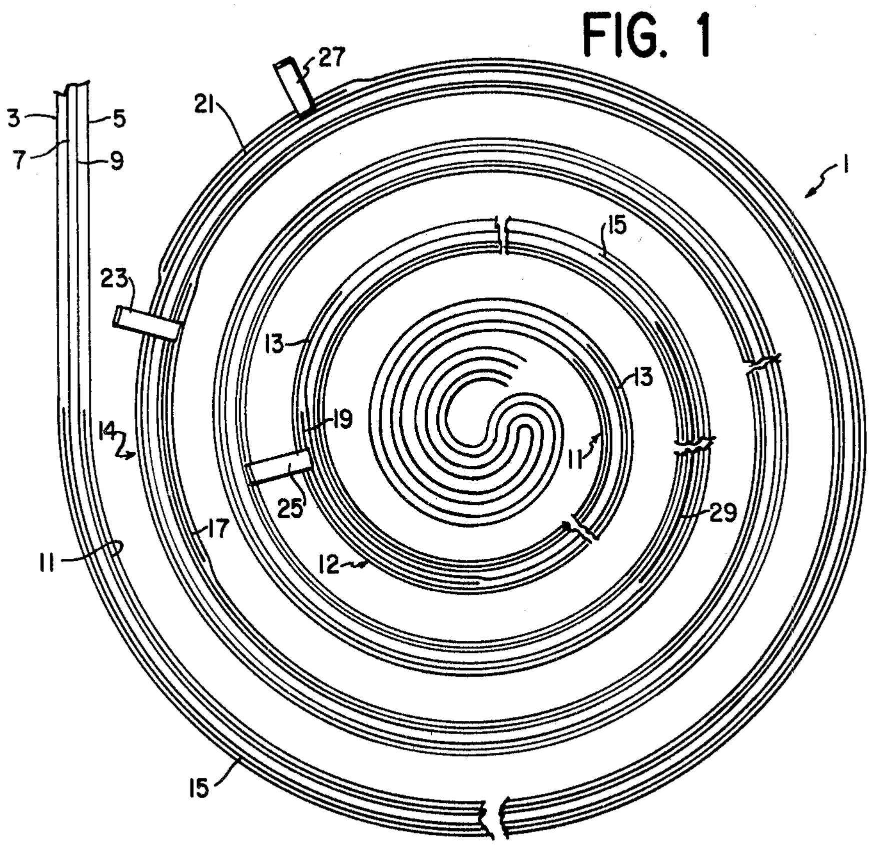
FIG. 1 is a plan view of a capacitor wound on the machine of the present invention.

FIG. 1 illustrates a capacitor wound on the machine of the preferred embodiment of the present invention. Capacitor 1 is a dielectric-conductive layer sandwich rolled into a right cylindrical shape. In the preferred embodiment, capacitor 1 comprises outer dielectric layers 3 and 5 and inner dielectric layers 7 and 9. Dielectric layers 3–9 may be made from paper approximately 0.0003 inch thick. Disposed between inner dielectric layer 9 and outer dielectric layer 5 is common electrode 11. Disposed between inner dielectric layer 7 and outer dielectric layer 3 are capacitor electrodes 13 and 15. In the preferred embodiment, common electrode 11 and capacitor electrodes 13 and 15 are constructed of aluminum foil about 0.0002 inch thick.

Capacitor electrode 13 is located near the center of the capacitor 1; whereas capacitor electrode 15 is placed after electrode 13 and spaced some distance therefrom. In contact with common electrode 11 and capacitor electrode 13 and 15 are tab webs 17, 19 and 21, respectively. Bonded to and extending axially from tab webs 17, 19 and 21 are tabs 23, 25 and 27, respectively. For reasons that will become evident below, tabs 23, 25 and 27 are located near the end of their respective tab webs farthest from the center of the capacitor. These tabs are bonded to the contacts that extend through the top of the metal capacitor can.

Capacitor 1 actually contains two capacitors: a relatively small capacitor is formed by capacitor electrode 13 and common electrode 11, hereinafter referred to as first capacitor section 12; and a relatively large capacitor is formed by capacitor electrode 15 and common electrode 11, hereinafter referred to as second capacitor section 14. One will also note that there are two dielectric layers between the common electrode and capacitor electrodes.

Capacitor 1 also has a structural insert 29. Insert 29 is approximately .003 inch thick. Structural insert 29 is preferably located in second capacitor section 14, i.e., the larger capacitor. This insures that the reduction in capacitance caused by the additional separation of the respective capacitor electrodes is negligible compared with the total capacitance of the capacitor.

In addition, structural insert 29 is preferably placed as near as possible to the interior of capacitor 1. Structural insert 29 provides structural support for capacitor 1 and helps prevent the collapse of capacitor 1 after it is stripped from the arbor upon which it is wound.

Capacitor 1 is the capacitor wound on the preferred embodiment of the present invention. From the specification below a person skilled in the art wil recognize that the present invention is adaptable to automatically wind capacitors made from other materials and even adaptable for machines that serve other purposes. For example, plastic layers could be used for the dielectric layers in capacitor 1; or vacuum deposited metal on a plastic carrier could be substituted for both a dielectric layer and electrode.

Figure 2A:
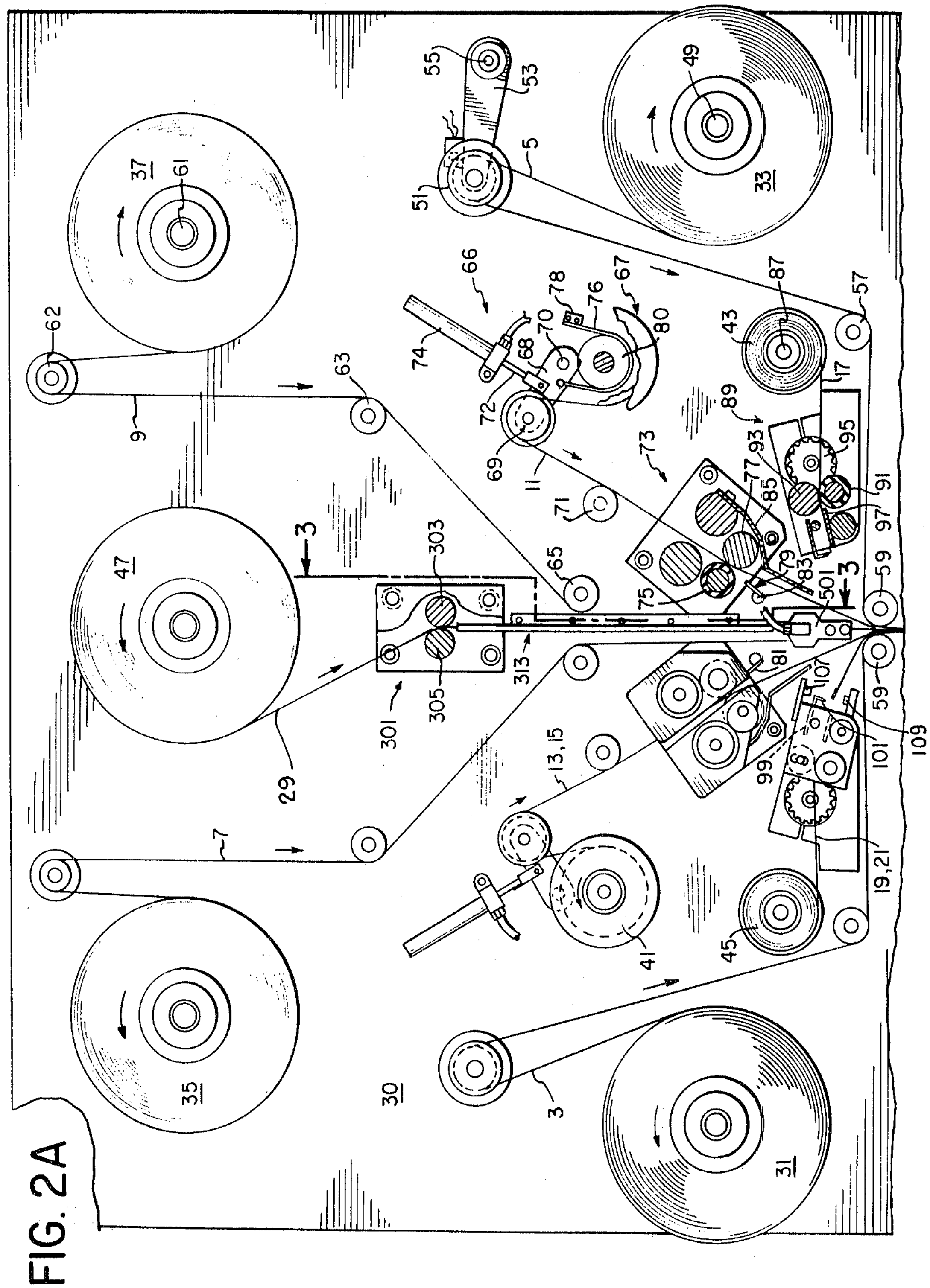
FIGS. 2A and B are front views of a schematic representation of the machine of the present invention.
Figure 2B:
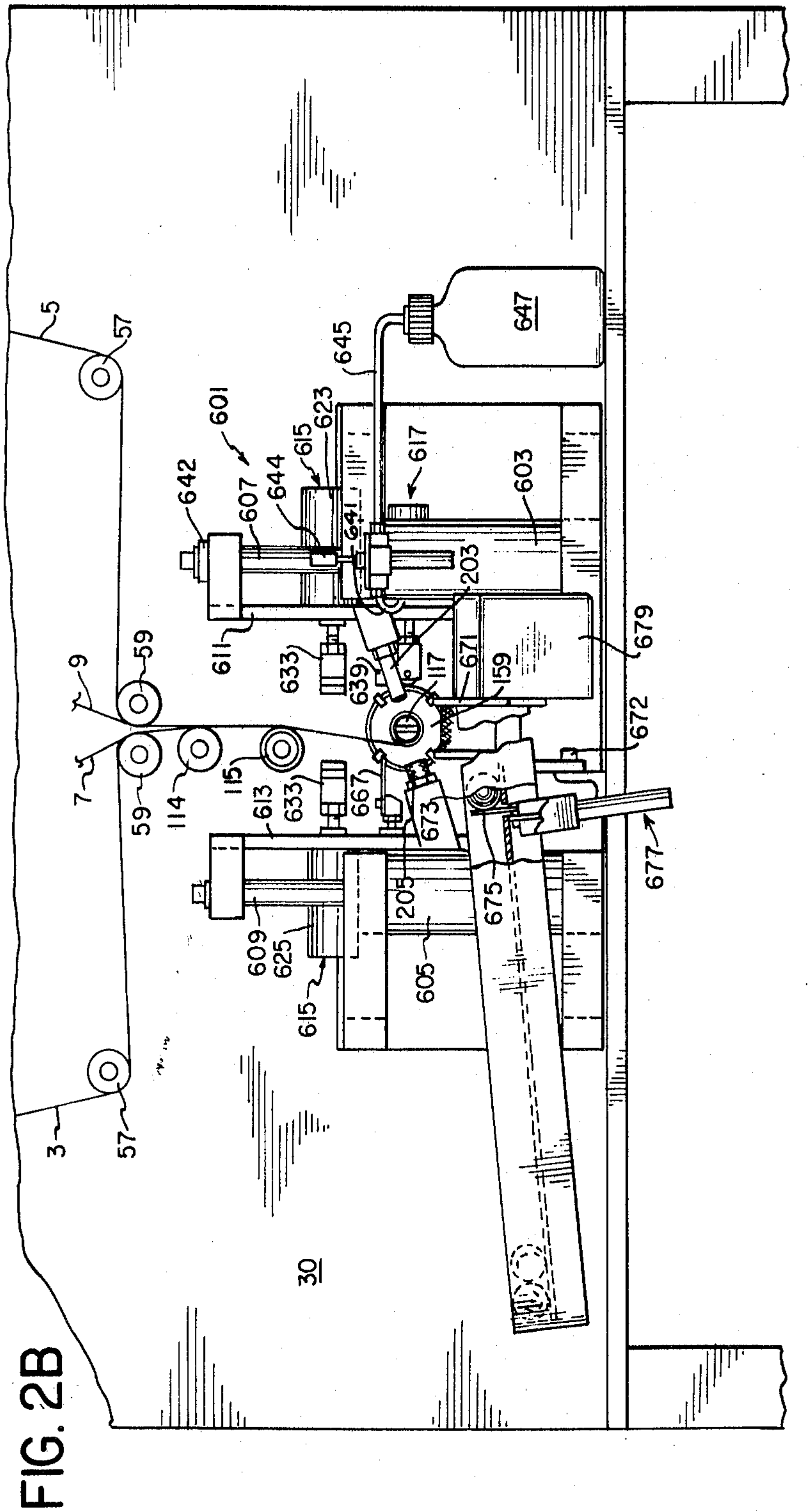

FIG. 2 is an illustration of the capacitor winding machine of the present invention. FIG. 2 is in two parts — FIGS. 2A and 2B. The preferred embodiment of the present invention is a modified prior art capacitor winding machine. For the most part, the modifications comprising the present invention appear in FIG. 2B, as will be more fully understood from the description below. Except as noted below, FIG. 2A is a schematic representation of the prior art semi-automatic Hilton Capacitor Winding Machine.

In keeping with the schematic nature of FIG. 2, many details have been omitted, in part or in whole. For example, generally tension arms for the layers have been omitted from the figure. The friction brakes associated with dielectric layer supply hubs are another example of the omission of items readily supplied by one skilled in the art.

The central timing means to which reference will often be made below is also not shown. It causes each of the elements of capacitor winding machine 1 to operate at the proper time in conformity with the description of the operation of the machine. In the preferred embodiment, the timing means comprises both timing relays, electronic timing means, and other well-known timing techniques. These items, and similar items not shown or described, and their application to this invention, are well known to those skilled in the art.

In FIG. 2A, the apparatus supplying the dielectric layers, electrodes, and tab webs for capacitor 1 is schematically diagrammed. Each component of capacitor 1 is supplied from a continuous roll of that component. That is, outer dielectric layer 3 is provided from dielectric (paper in the preferred embodiment) layer roll 31. Similarly, dielectric layers 5, 7 and 9 are provided from continuous dielectric layer rolls 33, 35 and 37. Common electrode 11 is supplied from continuous foil roll 39; capacitor electrode 13 and 15 are supplied from continuous foil rolls 41. Tab web 17 is supplied from continuous web roll 43 with tabs 23 (not shown) periodically bonded thereto. Similarly, continuous web roll 45 provides tab webs 19 and 21. Structural insert 29 is supplied from paper roll 47.

The path of the various dielectric layers, webs and electrodes is clearly shown in FIG. 2A. By way of example, outer dielectric layer 5 comes off dielectric layer roll 33. Dielectric layer roll 33 is mounted upon a rotatable hub 49. Dielectric layer 5 is threaded upwards around idler roller 51. Idler roller 51 is mounted upon arm 53 which in turn is pivoted on shaft 55 to provide constant tension in dielectric layer 5 in accordance with teaching well-known to one skilled in the art.

From idler roller 51, dielectric layer 5 is threaded downwards around idler roller 57 and between guide rollers 59. Guide rollers 59 do not touch, or even compress the layers passing therebetween. The path taken by dielectric layer 3 is the mirror image of that taken by dielectric layer 5.

The path taken by dielectric layers 7 and 9 are also mirror images of one another. Dielectric layer 9 is supplied by dielectric layer roll 37 which is mounted upon hub 61. From dielectric layer roll 37, dielectric layer 9 is threaded around idler rollers 62, 63, 65, alongside knife assembly 501 and between guide rollers 59.

The path of common electrode 11 and capacitor electrodes 13 and 15 are also clearly shown in FIG. 2A. For example, common electrode 11 is supplied from continuous foil roll 39. Foil roll 39 is mounted upon hub 67. From continuous foil roll 39, common electrode 11 is threaded up around idler roller 69, against idler roller 71, through drive assembly 73 and between guide rollers 59.

A hub brake means 66 is provided for hub 67. It includes idler roller 69 which is mounted on one end of arm 68. The other end of arm 68 is rotatably mounted on shaft 70. Also pinned to arm 68 is piston rod 72 of air cylinder 74 and one end of cable 76. The other end of cable 76 is grounded at 78. Normally the center portion of cable 76 passes around the periphery of brake drum 80 of hub 67 without engaging its surface. However, when air cylinder 74 is operated to withdraw piston rod 72, arm 68 rotates about shaft 70 and draws cable 76 against the surface of brake drum 80, imparting a frictional drag sufficient to stop the rotation of hub 67.

Drive assembly 73 consists in a pertinent part of a drive roller 75 and idler roller 77. Common electrode 11 is fed between drive roller 75 and idler roller 77. Idler roller 77 is biased by means not shown against drive roller 75 and drive roller 75 is driven, at the appropriate times, as described below. Drive roller 75 also has a slip clutch that permits the electrode to be pulled through the engaged drive roller 75 and idler roller 77 faster than drive roller 75 is being driven.

There are means, also not shown, for moving both drive roller 75 and idler roller 77 out of contact with capacitor electrode 15 and common electrode 11. As will become clearer after the description below, these means are provided to remove unnecessary drag on capactor electrode 15 and common electrode 11 when these electrodes are drawn from supply rolls 39 and 41 by arbor 117 at high speed.

Immediately following drive assembly 73 is a rotary cutter 79. Rotary cutter 79 comprises a blade 81 mounted upon shaft 83. Rotary cutter 79 is driven by means (not shown) at the appropriate time. Because of its location above and adjacent to the path of common electrode 11, when driven, blade 81 of rotary cutter 79 will pass through and sever common electrode 11.

Drive assembly 73 also includes guide plate 85. After common electrode 11 has been severed by rotary cutter 79 and upon the activation of drive roller 75 forcing common electrode 11 to move downward, guide plate 85 and the outside surface of knife assembly 501 direct common electrode 11 downward and into guide rollers 59.

The tab webs are supplied in a like manner. For example, tab web 17 is continuously supplied from tab roll 43. Tab roll 43 is rotatably mounted upon hub 87. From tab roll 43 tab webs 17 are threaded into drive assembly 89.

Drive assembly 89 includes a drive roller 91 and an idler roller 93. Idler roller 93 is biased against drive roller 91 by means not shown; drive roller 91 is driven by means schematically shown by gear 95. As more fully explained below, tab web 17 is periodically driven by drive assembly 89, under control of the central timing control.

Between idler roller 93 and drive roller 91, tab web 17 is threaded across ledge 97. Mounted above ledge 97 is reciprocating cutter 99. Reciprocating cutter 99 includes a blade 101 mounted upon a rotating shaft 103. When driven, by means not shown, shaft 103 rotates causes the cutting edge of blade 101 to sever tab web 17.

Disposed some distance in front of drive assembly 89 is a photodetector assembly (shown only on drive assembly 89 for tab webs 19 and 21 which are supplied from the same supply roll). The photodetector assembly includes a light source 107 and a light sensitive element 109. Photodetector assembly is positioned so that only tabs 23, 25 and 27 pass therebetween and the solid foil portions of tab webs 17, 19 and 21 do not pass therebetween. After passing from drive assembly 89, tab web 17 is directed between guide rollers 59.

Drive assemblies 89 associated with tab web 17 and 21, respectively are not equidistant from the centerline of the capacitor winding machine. Drive assembly 89 associated with tab web 17 is closer to the centerline than is drive assembly 89 associated with tab web 21. The difference is distance to the centerline is equal to the distance between tabs 23 and 27 in wound capacitor 1. Thus, when reciprocating cutters 99 cut both tab webs 17 and 21 simultaneously, tab 23 will be inserted the proper distance in front of tab 27 into capacitor 1. One skilled in the art will recognize that the same result could be attained by having drive assemblies 89 equidistant from the centerline but operating reciprocating cutters 99 sequentially, the time between the operation of the two cutters 99 selected so as to insure that tab 23 is inserted the proper distance in front of tab 27.

The description of the apparatus as shown in FIG. 2A to this point has primarily involved the apparatus of the prior art. There has not been included any of the principal modifications that form the present invention. A principal improvement provided by the present invention is automatically inserted structural insert 29 and its associated apparatus.

The following description of the structural insert means can be best understood by referring to FIGS. 2A, 3, 4 and 4A. From structural insert roll 47, structural insert 29 is threaded into the drive assembly 301. Drive assembly 301 includes a drive roller 303 and idler roller 305. Drive roller 303 is mounted upon shaft 307 which is attached to the shaft of motor 309 by drive chain 311. Motor 309 is activated in accordance with the description below by the central timing means. Idler roller 305 is biased against drive roller 303 by means also not shown.

Figure 4:
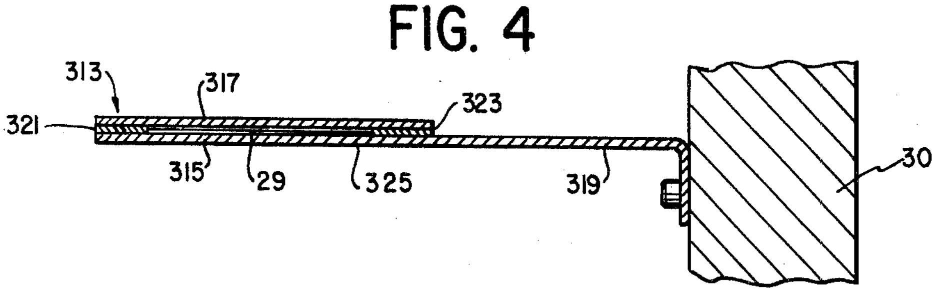
FIG. 4 is a plan sectional view along line 4—4 in FIG. 3 of the structural insert guide means.
Figure 3:
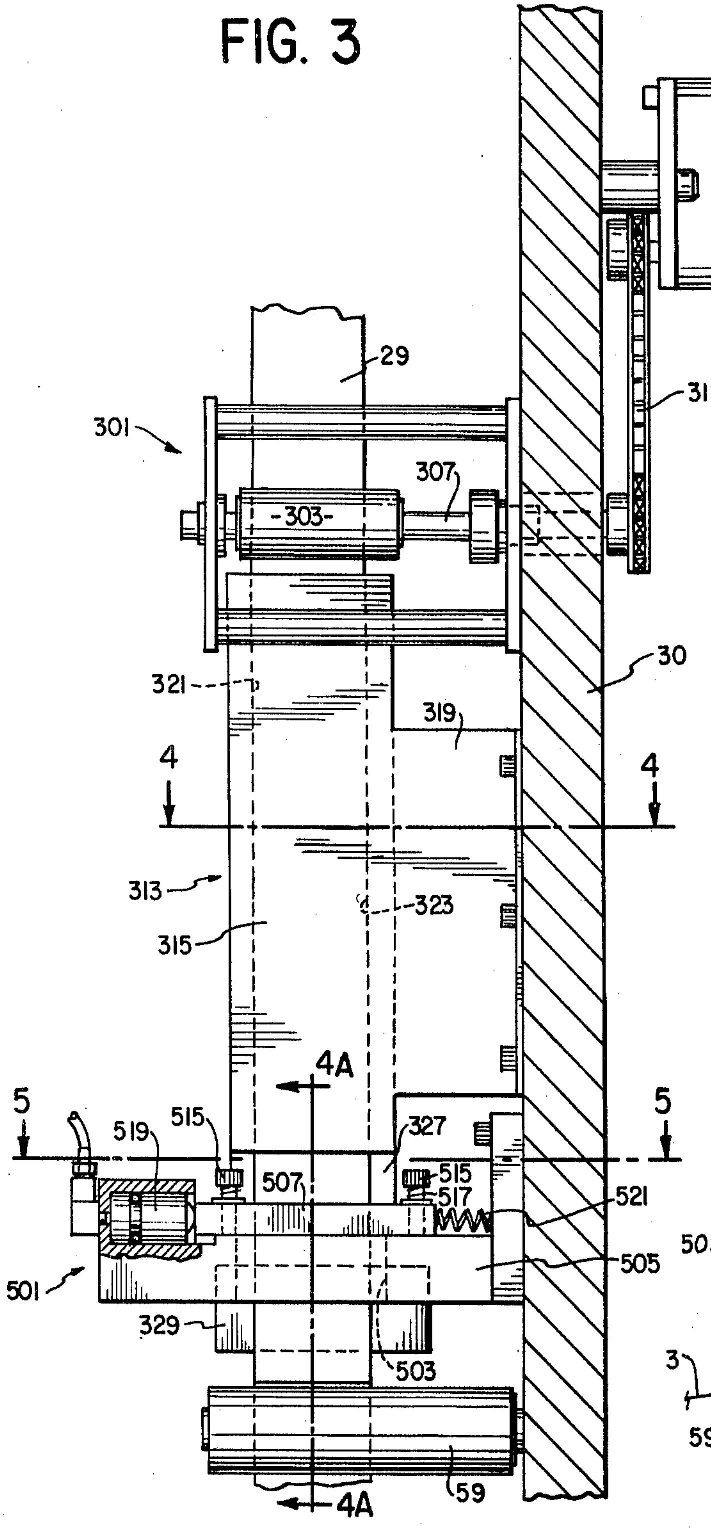
FIG. 3 is a side view taken along line 3—3 of FIG. 2A of the machine of the present invention showing in detail the structural insert means.

Structural insert 29 is driven into guide 313 as illustrated both in FIG. 3 and FIG. 4. Guide 313 includes two face plates 315 and 317. Face plate 315 has an L-shaped extension 319 which serves as a mounting bracket for guide 313. Separators 321 and 323 are disposed between face plates 315 and 317 to hold them in a parallel relationship and to form a channel 325. Structural insert 29 passes through channel 325.

Figure 4A:
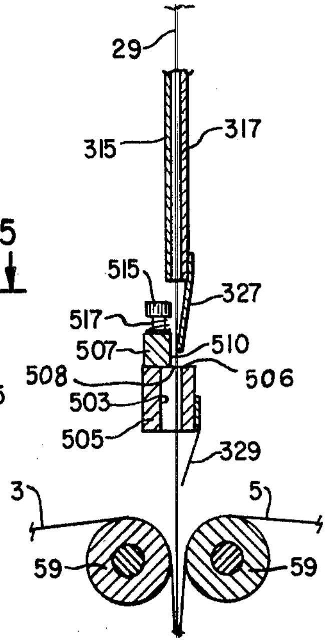
FIG. 4A is a side sectional view along line 4A—4A of FIG. 3 of the structural insert means.

Upon exiting from channel 325, structural insert 29 is guided downward by tongue 327 of back plate 317 into knife means 501 (FIG. 4A). Structural insert 29 passes through a channel 503 in knife body 505, which body has a cutting edge 506. Slidably mounted on knife body 505 is shearing blade 507 having a cutting edge 508. Shearing blade 507 has a rectangular notch 509 on one face through which structural insert 29 normally moves. Shearing blade 507 also has two slots 511 and 513 through which bolts 515 pass. Bolts 515 are fixed in knife body 505. Bolts 515 carry springs 517 which bear against the underface of the head of bolts 515 and the top surface of shearing blade 507, biasing the bearing surface of shearing blade 507 against the bearing surface or top of knife blade 505.

Particularly important to the design of knife means 501 is the shape of slots 511 and 513. Slot 511 is straight and oriented at an angle to the long surface 510 of rectangular notch 509. Slot 513 is arcuate and oriented substantially parallel to slot 511.

Shearing blade 507 is moved by the combined action of air cylinder 519 and spring 521. As a person familiar with pneumatics will clearly recognize, when the piston of air cylinder 519 is forced outwards by air introduced into the cylinder under control of the central timing means, shearing blade 507 will be forced to the right (as viewed in FIG. 5) compressing spring 521. Contrariwise, when the pressure in air cylinder 519 returns to the ambient, then compressed spring 521 will force shearing blade 507 back to its rest position, the position shown in FIG. 5.

Tongue 327 extends downward in a curved fashion toward shearing blade 507. In the preferred embodiment, the tip of tongue 327 does not contact shearing blade 507 when shearing blade 507 is in its unoperated position. However, shortly after shearing blade 507 begins its forward movement, surface 510 contacts the tip of tongue 327 springing it outward. When shearing blade 507 returns to its unoperated position, tongue 327 springs back to its rest position.

Figure 5:
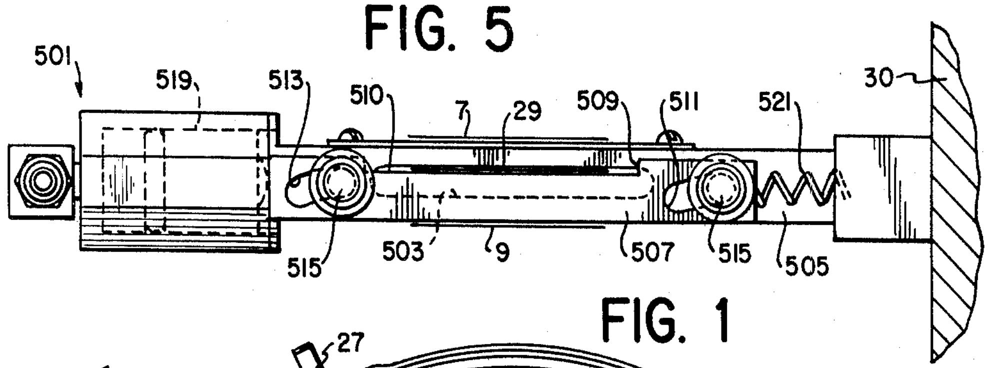
FIG. 5 is a plan view taken along line 5—5 of FIG. 3 showing the knife assembly for serving the structural insert.

Because of the angular relationship of slots 511 with that of the long surface 510 of notch 509 and sides of channel 503, shearing blade 507 will completely cover channel 503 when it has moved to its extreme operated position. However, because of the arcuate nature of slot 513 in contrast to the straight slot 511, surface 510 of rectangular notch 509 does not proceed to cover channel 503 in a uniformly parallel manner. Rather, the right-hand end of channel 503, as viewed in FIG. 5, is covered first. As shearing blade 507 proceeds to its fully operated position, it progressively covers more and more of channel 503 until it finally covers the left-hand end. Thus, structural insert 29 is sheared by knife assembly 501 in much the same nature as an ordinary scissor shears a sheet of paper. Because of this design, much less force is needed to cut structural insert 29 than if shearing blade 507 traveled in a parallel fashion across slot 511. Moreover, because of the relatively narrow design of knife means 501, the entire assembly can be accommodated on an unmodified prior art machine.

From knife assembly 501, structural insert 29 continues downward into guide rollers 59. A guide plate 329 (FIG. 3) provides a surface which aids the leading edge of insert 29 between guide rollers 59.

It should be noted that structural insert 29, despite its relative lack of body (paper apprxomately 0.003 inch thick), is driven from above by drive assembly 301, guide 313 and knife means 501, and between guide rollers 59. "Pushing" structural insert 29 through guide 313 and knife means 501, rather than pulling it through knife means 501, permits placing drive assembly 301 near structural insert roll 47 and provides space for knife assembly 501 without major reconstruction of the dielectric layer and clectrode paths of the prior art machine.

The length of structural insert 29 wound into capacitor 1 is determined empirically. Structural insert 29 serves to provide support for capacitor 1 to prevent its collapse. However, it should not be overly long or it will unduly affect the capacitance.

Figure 6:
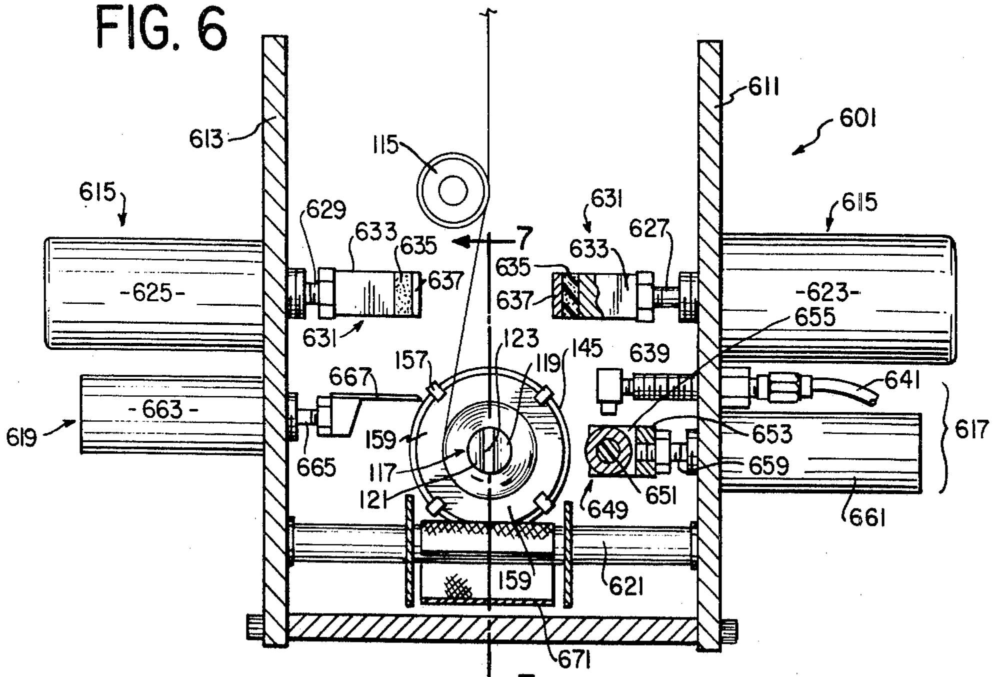
FIG. 6 is a front view of the arbor and elevator apparatus.

FIG. 2B illustrates the lower portion of the capacitor winding machine of the present invention. Repeated in FIG. 2B are guide rollers 59 and idler rollers 57 of FIG. 2A. Also shown are dielectric layers 3, 5, 7 and 9. All four dielectric layers enter guide rollers 59. From guide rollers 59, the dielectric layers are threaded downwards around idler rollers 114 and 115 and around bifurcated arbor 117. Arbor 117 includes two tangs 119 and 121 with a slot 123 (FIG. 6).

Idler roller 115 is offset slightly more to the right than idler roller 114, as viewed in FIG. 2B. These two rollers cause the various layers to be wound to be brought closer together and "smoothed" out. This latter function is most important to insure that the layers are not wrinkled in wound capacitor 1.

In accordance with this invention arbor 117 both rotates around its axis and translates axially, i.e. moves laterally along its axis. For this purpose, rotational motor means and lateral transport means are provided.

Arbor 117 is mounted on shaft 125. Shaft 125 is pressed into the inner race of bearings 127 and 129. The outer race of bearings 127 and 129 bear on the interior surface of hollow piston rod 131 of air cylinder 133.

Shaft 125 can both translate axially and rotate. A commercially available unit, marketed by Alkon Products, Wayne, New Jersey, is called an air extensible drill unit. This unit is shown schematically in FIG. 7.

Figure 7:
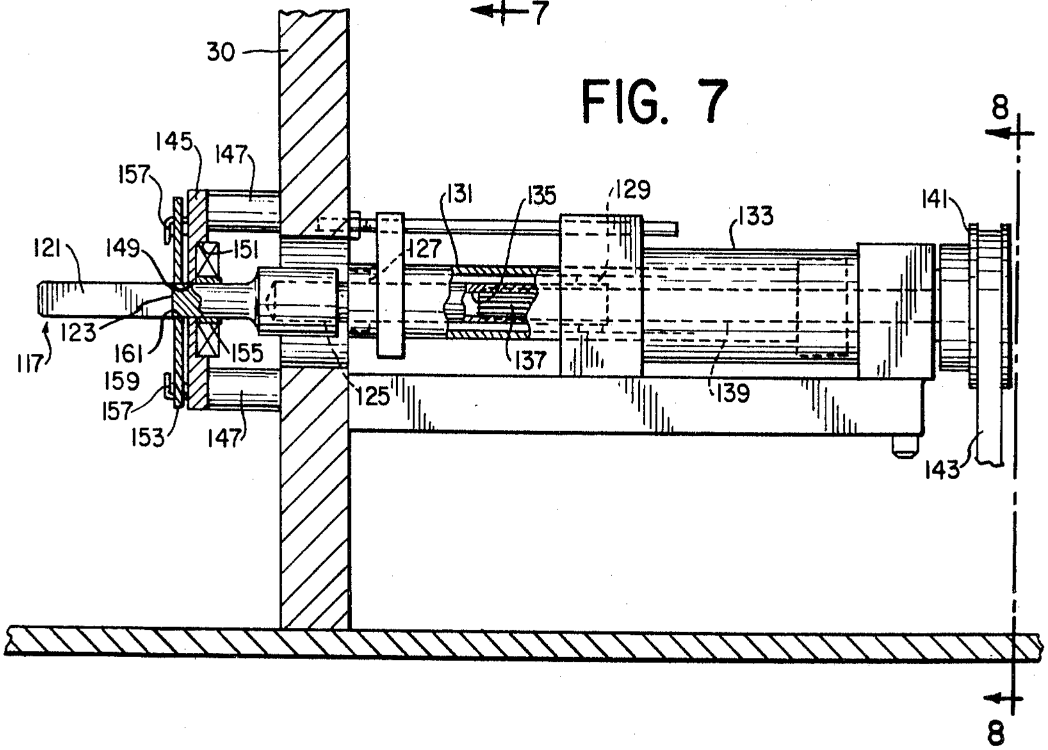
FIG. 7 is a side sectional view taken along line 7—7 of FIG. 6 of the bifurcated arbor and lateral transport means in the machine of the present invention.

As shown in FIG. 7, shaft 125 is hollow and has splines 135 on its inner diameter. Meshing with spines 135 are complementary splines 137 carried on a shaft 139. Shaft 139 is affixed to pulley 141. Pulley 141 carries timing belt 143. Under the movement of timing belt 143, arbor 117 will rotate upon its axis. Further, under the control of the central timing means, arbor 117 moves axially in accordance with the movement of piston rod 131 in air cylinder 133.

As previously described, a principal object of the present invention is to automatically produce capacitors whose inner windings have not telescoped beyond the capacitor body. Consistent with this object the present invention strips wound capacitor 1 off arbor 117 without causing the inner windings of capacitor 1 to extend beyond the body of capacitor 1. A review of the difficulties in accomplishing this object will lead to a fuller understanding of the present invention.

Some prior art machines also attempted to strip wound capacitors off an arbor by "pushing" the capacitor off the arbor. Although these machines sometimes worked initially, they eventually began to telescope the stripped capacitor. Their problem arose from the high wear of their parts. For example, in the method of the present invention, i.e., retracting the arbor axially through an opening in a plate, which blocks the capacitor and strips it off the arbor, the opening in the plate has to be only slightly larger than the diameter of the arbor. Otherwise, the inner windings of the capacitor could be drawn between the arbor and the plate, ie. "telescope" the capacitor.

However, in prior art machines, the opening in the stripper plate would not maintain its dimensions. It is subject to wear from at least these sources. First, the arbor rotates at high speed within the opening causing rotational frictional forces to wear and enlarge the opening. Second, the arbor's high acceleration and deceleration flexes the arbor and causes it to bear against the sides of the opening and further enlarge it. A third cause of wear is the arbor's axially translation through the opening. However, the arbor translates axially at relatively low speed.

It has been found that the wear due to the arbor's low speed axially translation is not significant. It is the wear from the arbor's flexing that appears most serious, closely followed by the wear caused by the arbor's high rotational speeds.

The present invention greatly reduces the wear to which the stripper means from the arbor's flexing and rotation. Thus, it consistently produces good capacitors over relatively long periods.

The stripper means includes a stripper plate 145 held in a spaced relationship from machine support plate 30 by spacers 147. At the center of stripper plate 145 is a circular opening 149 whose inner diameter is only slightly larger than the outer diameter of arbor 117. Coaxial with the center of opening 149 is a counterbore 151 in the rear surface of stripper plate 145. Inserted in counterbore 151 is a ball bearing 153. The inner race of bearing 153 carries a sleeve bearing 155. The inner diameter of sleeve bearing 155 slidably supports arbor 117.

Mounted on the front of stripper plate 145 are hooks 157. Hooks 157 are arranged in a circle concentric with the center of opening 149. Riding on arbor 117 is stripper washer 159, preferably made of bronze.

As shown in FIGS. 6 and 7, arbor 117 passes through the center hole 161 of stripper washer 159. The stripper washer is restrained from moving axially along arbor 117 by stripper plate 145 and hooks 157. Moreover, since hole 161 is slightly larger than the outside diameter of arbor 117, stripper washer 159 is free to rotate on arbor 117. However, because of the limited friction between stripper washer 159 and arbor 117, after arbor 117 has rotated at a steady speed for a short period, stripper washer 159 will be rotating at approximately the same speed.

Both stripper plate 145 and stripper washer 159 are preferably made of bronze; arbor 117 is preferably made of stainless steel. Thus, the sliding action of arbor 117 on stripper plate 145 and stripper washer 159 will not score arbor 117. Although this sliding action may cause both stripper washer 159 and stripper plate 145 to wear, enlarging the clearance between arbor 117 and openings 149 and hole 161, as described above, because of the low lateral speeds of arbor 117, this wear is not excessive.

However, stripper washer 159 has substantially no wear due to arbor 117's flexing and rotation. Although arbor 117's rotational speed is high, stripper washer 159 rotates with arbor 117 so that there is little or no relative rotational motion between the two. Also, stripper washer 159 flexes with arbor 117, preventing wear to stripper washer 159 from this source. Thus, the clearance between stripper washer 159 and arbor 117 remains constant.

When arbor 117 translates laterally to its retracted position, the rear face of capacitor 1 bears against stripper washer 159. Because of the constant nominal clearance between arbor 117 and hole 161, there is no room for the inner windings of capacitor 1 to travel between the stripper washer 159 and arbor 117 and "telescope" out of the main body of capacitor 1. And, as just noted, this nominal clearance is not subject to a large variation because of wear. Of course, if for some reason undesirable wear does occur to stripper washer 159, it is easily and inexpensively removed and replaced.

Figure 8:
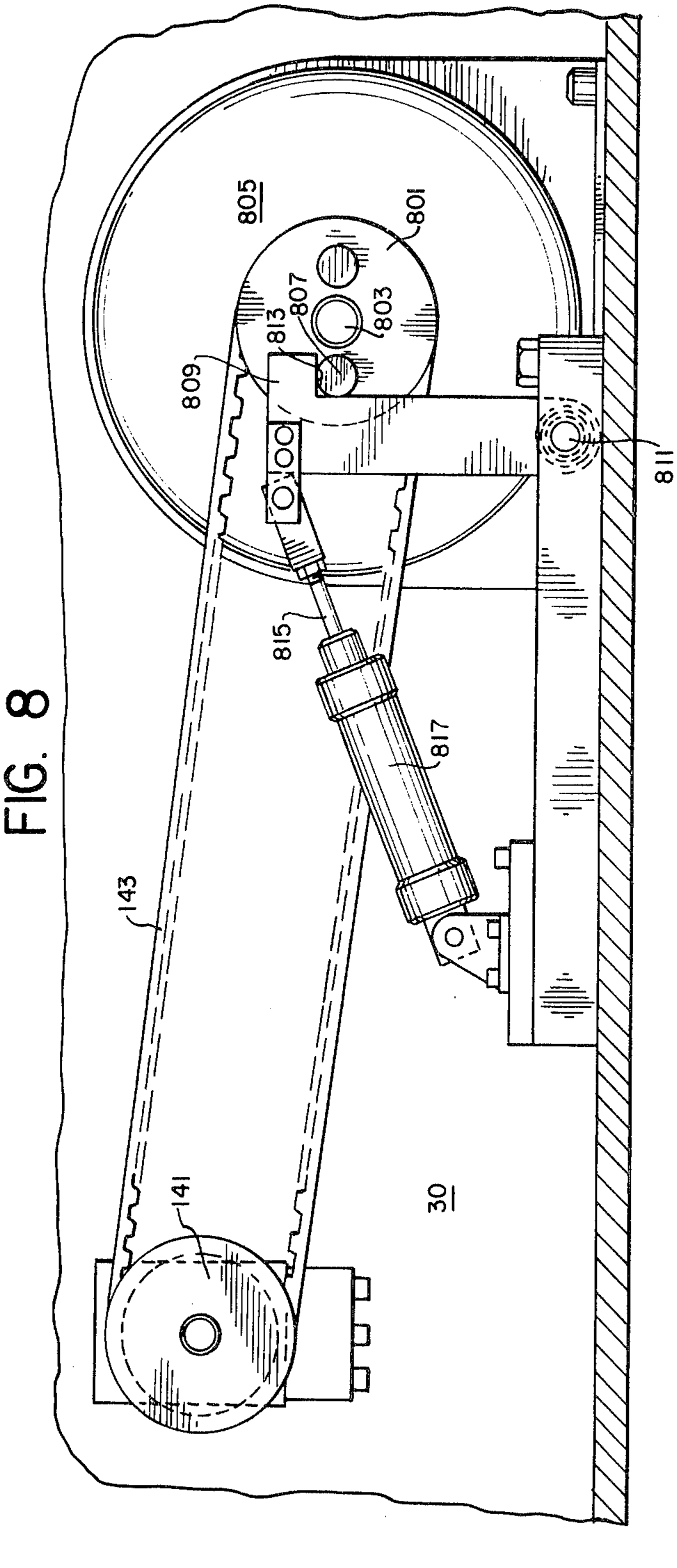
FIG. 8 is a rear view of the machine of the present invention showing the rotational motor means and registering means for the bifurcated arbor.

FIG. 8 shows the motor for driving the arbor 117 and the registering means for registering arbo 117 so that slot 123 is in an absolutely vertical orientation. This orientation is necessary for proper "threading" of the arbor. Timing belt 143 engages pulleys 141 and 801. Pulley 801 is affixed to shaft 803 of motor 805. Pulley 801 also carries two cylindrical detents 807. Detents 807 are located on the same diameter of pulley 801 on either side of shaft 803. In the preferred embodiment, pulley 801 and pulley 141 have the same diameter. Thus, there is a one-to-one correspondence in the rotation of shaft 803 and arbor 117.

A pawl 809 is rotatably mounted on pin 811. When pawl 809 is rotated into a vertical orientation, shoulder 813 on pawl 809 will engage one of the two cylindrical detents 807 as they are carried by pulley 801 and prevent further rotation of pulley 801. The relationship of the detents is such that when pawl 809 engages either of the two detents 807, arbor 117 is stopped with slot 123 in a vertical orientation.

Pawl 809 is rotated by piston rod 815 of air cylinder 817. Air cylinder 817 is under the control of the central timing means.

In the preferred embodiment, in order to prevent unnecessary shock to the apparatus, before pawl 809 is rotated into position to engage detent 807 motor 805 is momentarily deenergized, which stops the rotation of pulley 801. Pawl 809 is then rotated into engagement position and motor 805 is re-energized to drive one of the detents 807 into engagement with pawl 809. Because the most that motor 805 can rotate before it is stopped by pawl 809 engaging detent 807 is 180°, motor 805 does not reach a high speed. Thus, detent 807 contacts shoulder 813 of pawl 809 positively, but without excessive force.

Motor 805, under proper control of the central timing means, provides two speeds: a jog (low) speed and a high speed. The jog speed is used until capacitor 1 has sufficient integrity in its inner windings to prevent the higher tension in the outer windings generated by the high winding speed to prevent capacitor 1's collapse when it is removed from arbor 117. In the preferred embodiment, the job speed is maintained until after structural insert 29 is in place.

Jog speed is also used near the completion of capacitor 1. Shortly prior to the severing of capacitor electrode 15 and common electrode 11, motor 805 returns to jog speed. Time is provided for motor 805 to stabilize at this low speed. Then, as described below, motor 805 is momentarily deenergized, stopping its rotation and halting the winding of capacitor 1. This stoppage allows drive rollers 75 and idler rollers 77 to move into contact with stationary electrodes 11 and 15. This procedure avoids moving non-rotating drive rollers 75 and idler rollers 77 into contact with the moving electrodes 11 and 15, and thus avoids the consequent damage that might occur to electrodes 11 and 15.

In FIGS. 2B and 6, the paper transport means can be seen. An elevator apparatus 601 is illustrated. Air cylinders 603 and 605 move piston rods 607 and 609 under control of the central timing means. Attached to piston rods 607 and 609 are support plates 611 and 613. Carried by support plates 611 and 613 are the following: transport means 615, capacitor sealing means 617, dielectric layer severing means 619 and conveyor control bar 621. Each of these means is now described in greater detail.

Paper transport means 615 includes two air cylinders 623 and 625. Air cylinder 623 is larger than air cylinder 625. These cylinders have piston rods 627 and 629 respectively, each of which carries a clamp 631. Clamps 631 comprise a rectangular portion 633, a rectangular rubber cushion 635 and a stainless steel face 637.

As one skilled in the art will recognize, when pistons 623 and 625 extend, faces 637 will automatically align because of the compressibility of rubber cushions 635 (rubber cushion 635 in the preferred embodiment has a hardness of around 60 durometer). Further, since air is supplied at the same pressure to both cylinders, piston rod 627 of larger air cylinder 625 will extend fully presenting a predetermined position for clamping dielectric layers 3–9. Moreover, one skilled in the art will recognize that the stainless steel faces 637 which contact paper layers 3 and 5 will not be corroded by the resins and other chemicals which might be present dielectric layers.

Capacitor sealing means 617 includes a water ejector 639. The water is supplied to water ejector 639 through conduit and fittings 641 which lead from pump 643. Pump 643 is also connected to water supply 647 by tube 645. Whenever elevator apparatus 601 descends (as described below), surface 642 of elevator apparatus 601 depresses piston 644 of pump 643 to pump a few drops of water from water supply 647 to water ejector 639.

Located directly below water ejector 639 is wetting roller 649. Wetting roller 649 includes a Delrin axle 651 mounted in a brass yoke 653. Rotating freely on axle 651 is a stainless steel cylinder 655 which is covered by a water retaining cork cylinder 657. These materials are selected both according to their function and their resistance to corrosion. One skilled in the art could substitute other materials having similar functions. For example, if water did not properly seal the capacitor, an adhesive or heat seal method could be substituted.

Yoke 653 is carried by piston rod 659 of air cylinder 661. Air cylinder 661 is mounted upon support plate 611 as shown in FIG. 6. In operation, when activated by the central timing means, piston rod 659 extends wetting roller 649 to contact the outer surface of rotating capacitor 1, thereby wetting and sealing it.

Dielectric layer severing means 619 includes an air cylinder 663 with an associated piston rod 665. Attached to piston rod 665 is a serrated blade 667. At the appropriate time under control of the central timing mechanism, piston rod 665 extends causing blade 667 to contact the then taut dielectric layers 3, 5, 7 and 9 and thereby sever them.

Also shown in FIGS. 2B and 6 is the capacitor conveyor means 669. This means includes a conveyor belt 671 which catches the wound capacitor after it is stripped off arbor 117. Motor 679 powers belt 671. Belt 671 conveys the capacitor to ramp 673. Gate 675, normally in the raised position, blocks ramp 673 and causes the leading end of capacitor to strike the side of ramp 673 with the cylinder's axis perpendicular to the length of ramp 673.

Air cylinder 677 lowers gate 675, under control of the central timing means, at the same time that dielectric layer severing means 619 is operated, thereby allowing wound capacitor 1 to roll down ramp 673. Thus, gate 675 prevents capacitor 1 from starting to slide down ramp 673 until the entire capacitor 1 is present in front of ramp 673. If not for gate 675, capacitor 1 might slide down ramp 673 askew.

The axle under arbor 117 upon which belt 671 rotates is attached to conveyor control bar 621. Ramp 673 also (as seen in FIG. 2B) is rotatably pinned on axle 672. Thus, belt 671 and ramp 673 follow the motion of elevator mechanism 601. That is, when the elevator mechanism descends, as described below, belt 671 also descends.

Also clearly shown in FIG. 2B is the tab sensing mechanism 201, which is a key part of the tab insert means. As has already been described, capacitor 1 has three tabs which must be accurately oriented with respect to each other. However, as long as the tab webs with which the tabs are associated contact the proper capacitor electrode, the relative position of the webs with respect to the capacitor is unimportant. Therefore, as will be more fully understood after reading the "Operation" below, the first tab 25 is inserted arbitrarily during the time when its tab web 19 will be in position to contact capacitor electrode 13. Upon insertion of tab 25, the central timing mechanism counts an appropriate number of turns of arbor 117. When the appropriate number of turns have occurred, it is the approximate time for the insertion of the remaining two tabs 23 and 27.

To insure that they are inserted at the precisely correct position, the exact rotational position of already inserted tab 25 must be known. This is accomplished through means of phototransistor 203 and light source 205. Light source 205 emits a relatively wide beam of light whereas phototransistor 203 is sensitive to a relatively narrow beam of light. During its rotation, tab 25 will cross light beam 205 twice: once when tab 25 is closest to light source 205, and once when tab 25 is closest to phototransistor 203. However, because of the wide beam emitted by light source 205, when tab 25 is closest to light source 205, tab 25 is not large enough to completely block the light from reaching phototransistor 203. But when tab 25 is closest to phototransistor 203, because of the narrow acceptance angle of phototransistor 203, it will block all light reaching phototransistor 203.

Thus, although tab 25 crosses the light beam twice, the light to phototransistor 203 is blocked only at one unique position of tab 25 during its rotational travels. This position is sensed by the central timing means and, as described below, causes tabs 23 and 27 to be inserted. Moreover, because both phototransistor 203 and light source 205 lie in a plane parallel to machine back 30, they are located as close as possible to machine back 30, which reduces the likelihood that an operator will accidentally strike and damage them.

OPERATION OF THE PREFERRED EMBODIMENT

Figure 9:
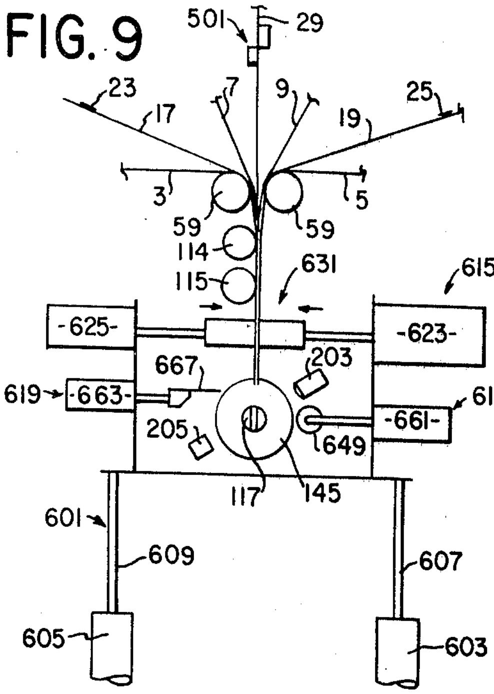
FIGS. 9–14 are schematic representations of the machine of the present invention during different stages of its operation.

FIGS. 9–14 show a capacitor being wound in various stages on the machine of the present invention. FIG. 9 shows the stage after a previously wound capacitor has been removed from arbor 117 and the machine is about to wind the subsequent capacitor. Dielectric layers 3, 5, 7 and 9 are shown led through guide roller 59, past idler rollers 114 and 115 and between closed clamps 631.

Common electrode 11 and capacitor electrode 13 have been fed so that their leading edges are near the convergence of dielectric layers 5 and 9 and layers 3 and 7, respectively. In the position when the converging dielectric layers are in motion, they exert a frictional pull on the electrodes. This frictional pull would cause the electrodes to advance if they were not restrained. The restraint is provided by hub brake means 66. That is, arm 68 has been rotated clockwise to draw cable 76 against brake drum 80 of hub 67, preventing the rotation of hub 67 and the advancement of electrode 11 (and 13).

Similarly, the leading edge of structural insert 29 is located between converging dielectric layers 7 and 9. Locked drive roller 303 restrains the movement of structural insert 29.

Figure 10:
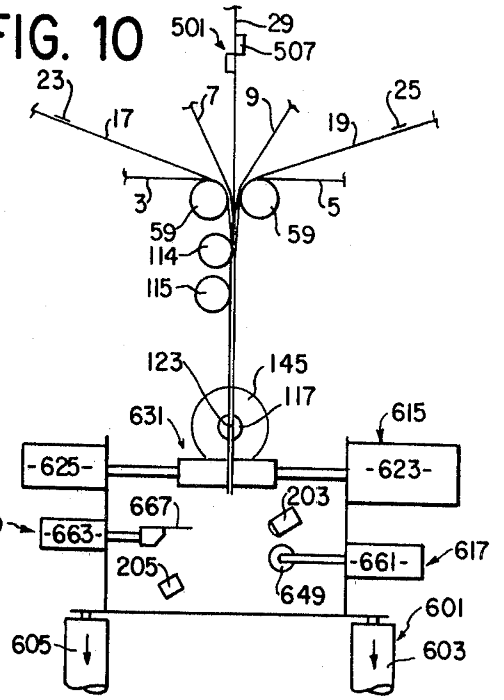

Clamps 631 are lowered by elevator apparatus 601. That is, piston rods 607 and 609 recede into air cylinders 603 and 605 respectively, carrying clamps 631 and their associated apparatus downward. This is illustrated in FIG. 10, where clamps 631 have carried the ends of dielectric layers 3, 5, 7 and 9 below arbor 117 which, until this point, has been retracted into the face of stripper plate 145. Arbor 117 has also been locked with its slot 123 in a vertical orientation by pawl 809 engaging one of detents 807.

When elevator assembly 601 has lowered clamps 631 to the furthest downward position, arbor 117 moves axially from behind stripper plate 145 through the action of air cylinder 133. Tangs 119 and 121 envelope dielectric layers 3, 5, 7 and 9 (see FIG. 10).

When arbor 117 is fully extended, the pressure in air cylinders 623 and 625 is reduced, thereby relieving to a predetermined extend the pressure between clamps 631. This predetermined lesser pressure is empirically determined to be sufficient to hold dielectric layers 3–9 between clamps 631 but permit withdrawal of dielectric layers 3–9 from between clamps 631 without damage to the dielectric layers.

Next, pawl 809 disengages detent 807 through means of air cylinder 817 and piston rod 815, and motor 805 is energized. Arbor 117 is driven through timing belt 143, pulley 141, shaft 139 and 125.

Figure 11:
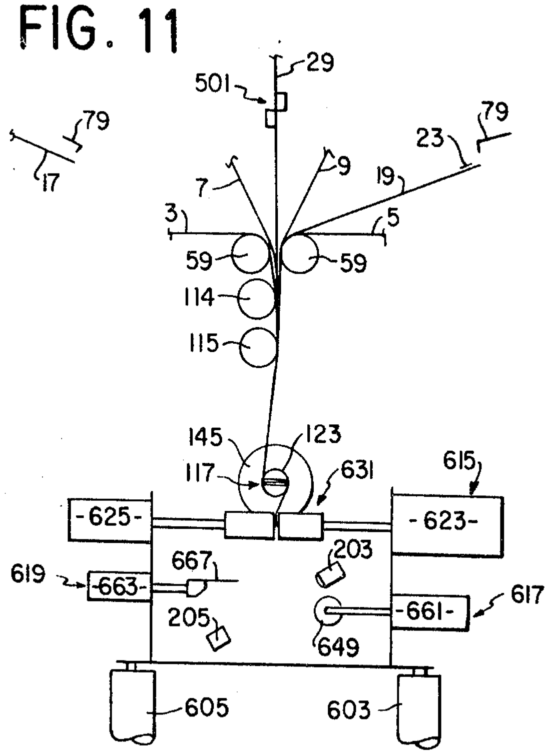

Motor 805 first rotates at a slow or jog speed. Referring to FIG. 11, as dielectric layers 3–9 begin to wrap around arbor 117, they will both be drawn from between clamps 631 and from supply rolls 31, 33, 35 and 37.

When the arbor has made a predetermined number of revolutions, and thus has a predetermined number of wraps of dielectric layers 3–9 around it, piston rod 72 is extended from air cylinder 72 to relieve the pressure cable 76 exerts on brake drum 80. Simultaneously, drive rollers 75 drive electrodes 11 and 13. Eventually, the leading edges of electrodes 11 and 13 will wrap around arbor 117. Since the rate at which rotating arbor 117 pulls electrodes 11 and 13 is greater than the rate at which drive rollers 75 drive electrodes 11 and 13, and since the slip clutches in drive rollers 75 allow electrodes 11 and 13 to be pulled faster through drive roller 75 and idler rollers 77 than the driven rotational speed of drive rollers 75, the feed speed of electrodes 11 and 13 is then governed by the rotation of arbor 117.

Figure 12:
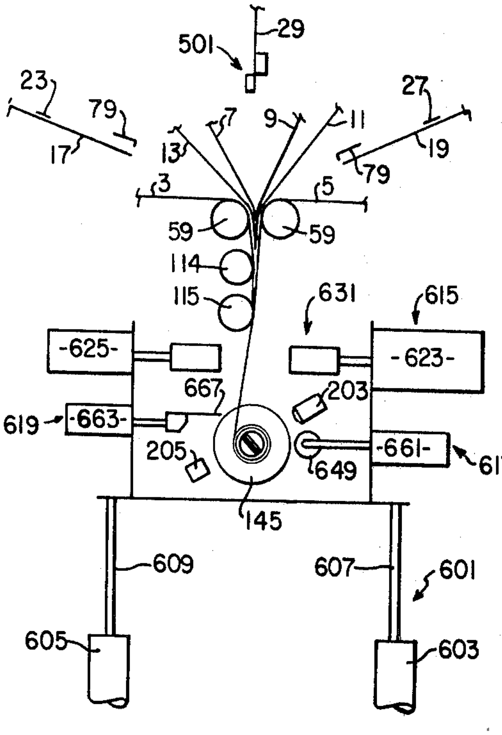

During this period, elevator apparatus 601 has caused transport means 615, dielectric layer severing mechanism 619, and capacitor sealing means 617 to be raised to their upper position. The capacitor winding machine at this stage is shown in FIG. 12.

Approximately at the same time that electrodes 11 and 13 are fed, tab web 19 is extended. Drive assembly 89 is energized, causing drive roller 91 to drive tab web 19 toward converging dielectric layer 3 and capacitor electrode 13. Tab web 19 is driven until photodetector assembly 105 senses the presence of tab 25. At this point, drive roller 91 is locked. However, the leading edge of tab web 19 has been fed to the point where the dielectric layer 3 and capacitor electrode 13 converge. However, since tab web 19 has not yet been severed from its supply roll 45, it is prevented from being drawn down past guide rollers 59 and wound into capacitor 1. FIG. 11 illustrates the capacitor winding machine 1 at this stage.

When the appropriate time arrives for tab web 19 to be inserted, reciprocating cutter 99 is energized, severing tab web 19 from supply roll 45 and allowing it to be drawn into capacitor 1. As previously mentioned, the exact location of web 25 is not critical. The only necessary criteria is that it overlie capacitor electrode 13.

When a predetermined length of capacitor electrode 13 has been wound upon arbor 117, determined by the number of arbor rotations, rotary cutter 79 severs capacitor electrode 13. Drive assembly 73 associated with electrode supply roll 41 continues to drive that electrode toward the converging dielectric layers 3 and 7 to form capacitor electrode 15.

Since arbor 117 has been pulling electrode 13 at a rate greater than drive assembly 73 can feed electrode 15, there will be a space between the end of electrode 13 and the beginning of electrode 15. That is, arbor 117 does not begin to pull electrode 15 until the leading edge is about to be wound into capacitor 1. Therefore, until this point electrode 15 moves slower than electrode 13, causing a space between the two electrodes.

Figure 13:
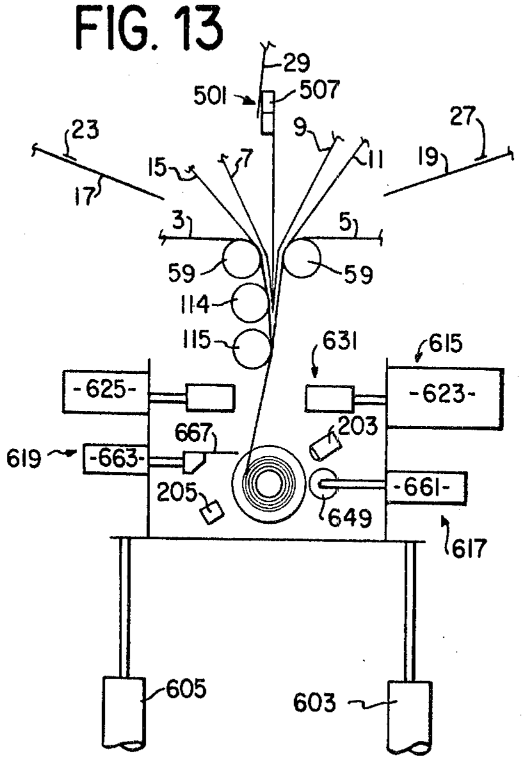

At the same time the beginning of electrode 15 starts to wind into capacitor 1, structural insert 29 is inserted. Since the previous cycle the leading edge of structural insert has been waiting at the convergence of dielectric layers 7 and 9. At the proper instant, shearing blade 507 is driven forward by the piston rod of air cylinder 519 to sever structural insert 29. This instant of operation is shown in FIG. 13. Structural insert 29 is drawn between guide rollers 59 by the friction created between structural insert 29 and converging dielectric layers 7 and 9 and wound into the capacitor around arbor 117.

After structural insert 29 is in place in capacitor 1, drive rollers 75 are withdrawn from contact with capacitor electrode 15 and common electrode 11. Motor 805 is then energized to run at full speed — approximately 1600 rpm. As previously explained, the initial capacitor windings are now sufficiently stable to prevent collapse of capacitor 1 when it is stripped off arbor 117. Also, because drive rollers 75 are no longer in contact with capacitor electrode 15 and common electrode 11, no unnecessary drag is placed on these fragile electrodes.

After a predetermined number of arbor 117 rotations, the time to insert tabs 23 and 27 arrives. The angular location of these tabs with respect to each other and tab 25 is critical. Therefore, their insertion is closely regulated.

Shortly before tabs 23 and 27 are inserted, drive assemblies 89 associated with foil rolls 43 and 45 are energized, causing the respective drive rollers 91 to drive tab webs 17 and 21. Tab webs 17 and 21 are driven until photodetector assemblies 105 associated with each drive assembly 89 sense tabs 23 and 27, respectively. The associated drive rollers 91 are locked, leaving the leading edges of their associated tab webs in slip engagement with the converging common or capacitor electrode and dielectric layer.

When sufficient time has elapsed for the tab webs to have assumed a position with their tabs beneath photodetector assemblies 105, tab sensing mechanism 201 is activated. As previously described, tab sensing mechanism detects the presence of tab 25 when it is directly in front of and closest to phototransistor 203. When tab 25 reaches this position, this information is conveyed to the central timing means. The central timing means, after a predetermined delay, causes reciprocating cutters 99 associated with tab webs 17 and 21 to be energized, severing tab webs 17 and 21 from tab rolls 43 and 45, and allowing them to be drawn into capacitor 1. Because of the previously described offset of the leading edge of tab web 17 and tab web 21, tab web 17 enters capacitor 1 before tab web 21, and tabs 23 and 27 are properly displaced from each other and tab 25.

After the predetermined lengths of capacitor electrode 15 and common electrode 11 have been drawn from their respective supply rolls 39 and 41, they must be severed from their supply rolls. Motor 805 is first slowed and then momentarily deenergized, resulting in a momentary halt of all paper and foil movement. Drive rollers 75 and idler rollers 77 are moved into contact with capacitor electrode 15 and common electrode 11, motor 805 is reenergized to operate at jog speed, and rotary cutters 79 associated with capacitor electrode 13 and common electrode 11 are energized, severing common electrode 11 and capacitor electrode 15. As previously described, this procedure permits drive rollers 75 and idler rollers 77 to grasp stationary electrodes 11 and 15 and avoid damage to those electrodes that could be caused by contact between non-synchronous surfaces.

After common electrode 11 and capacitor electrode 15 have been wound around arbor 117, and after a predetermined number of additional rotations of arbor 117, which deposits additional layers of dielectric layers 3–9 on capacitor 1, motor 805 is again deenergized. This causes arbor 117 to halt its rotation.

Transport means 615 is then energized. Air cylinders 623 and 625 cause piston rods 627 and 629, respectively, to carry clamps 631 toward each other to firmly grasp dielectric layers 3–9. Any alignment difficulties between clamps 631 are automatically corrected by rubber cushions 635.

Dielectric layer severing mechanism 619 is then energized. Air cylinder 663 causes piston rod 665 to extend, carrying serrated blade 667 into and through dielectric layers 3–9.

Figure 14:
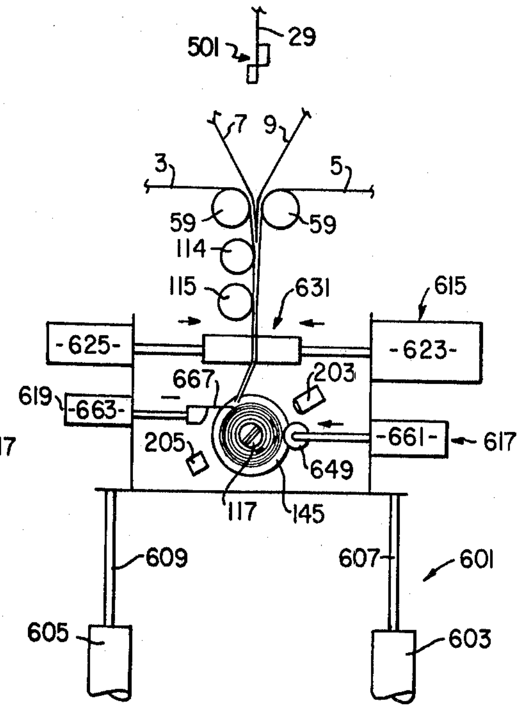

Subsequently, motor 805 is reenergized at jog speed to rotate arbor 117. Capacitor sealing means 617 is energized, causing cylinder 655 and its covering cork cylinder 657 to contact capacitor 1 and wet capacitor 1's outer surface. This is shown in FIG. 14. The moisture imparted to capacitor 1 by wet cork cylinder 657 causes the outer layers of dielectric layers 3–9 to adhere to each other.

Capacitor sealing means 617 is then deenergized, withdrawing cylinder 655 from capacitor 1. Subsequently, motor 805 is deenergized and pawl 809 is rotated into position to engage detents 807. Motor 805 is energized, rotating pulley 801 to engage one of the detents 807. This halts the rotation or arbor 117 with slot 123 in a vertical orientation.

Arbor 117 is then moved axially towards its retracted position by the piston rod 131 receding into air cylinder 133. As arbor 117 withdraws, the rear flat surface of capacitor 1 bears against stripper washer 159. Thus, stripper washer 159 forces capacitor 1 off arbor 117. Because of the close clearance between stripper washer 159 and arbor 117, none of the inner windings of capacitor 1 can be pulled between stripper washer 159 and arbor 117, preventing "telescoping" of capacitor 1.

Eventually, arbor 117 is completely withdrawn from capacitor 1, allowing capacitor 1 to fall onto capacitor conveying means 669. Belt 671 carries capacitor 1 to ramp 673. Capacitor 1 is stopped from rolling down ramp 673 by gate 675.

Near the end of the cycle drive assemblies 73 and drive assembly 301 are energized. They drive electrodes 11 and 13 and structural insert 29 to the position which they assume at the beginning of the next cycle. That is, electrodes 11 and 13 are driven into converging dielectric layers 5 and 9 and dielectric layers 3 and 7, respectively, at guide rollers 59.

The leading edge of structural insert 29 is fed through guide 313 and knife means 501. Structural insert 29 is then guided into channel 503 by tongue 327 and through knife means 501 to a point around guide rollers 59, where dielectric layers 7 and 9 converge. Cables 76 engage brake drum 80 and drive wheel 303 is locked to prevent electrodes 11 and 13 and structural insert 29 from feeding further by means of the frictional pull exerted by dielectric layers 3–9.

Capacitor 1 waits at gate 675 until the next cycle. When dielectric layer severing means 619 is operated, air cylinder 677 causes gate 675 to fall, allowing capacitor 1 to roll to the bottom of ramp 673.

While the invention has been particularly shown and described with reference to a preferred embodiment, it will be understood by those skilled in the art that changes in form and details, some of which have been described, may be made without departing from the spirit and scope of the invention.

What is claimed is:

1. A photoelectric device for sensing when an object which travels a predefined path and which crosses a line a plurality of times is at a first point of crossing on the path which is nearest a first end of said line comprising:

a light detector having a relatively narrow angle of light acceptance located proximate said first end of said line and responsive to light impinging thereon; and a light source proximate the second end of said line for transmitting a beam of light, which is wider at a point of corssing on the path which is further from said first end of the line than said first point of crossing than the widest portion of the object, along said line, whereby said object prevents said beam from impinging on the detector only when said object is at said first point of crossing on the path closest to said first end of said line.

2. A photoelectric sensing device as in claim 1 wherein said predefined path is a circle.

3. A photoelectric sensing device as in claim 1 wherein said light detector is a phototransistor.

4. A photoelectric device for sensing the position of an object rotated by a rotating arbor comprising:

means for producing a light beam directed along a line which lies in a plane perpendicular to the access of rotation of said arbor which is crossed only twice by said rotating object, the width of said light beam being greater than the width of said object at the line crossing nearest said light beam producing means; and light detector means positioned to receive light directed along said line and responsive to light impinging thereon, said light beam detector means having an angle of light acceptance such that said light beam is prevented from impinging on it only when said object is at the light crossing nearest said responsive means.

* * * * *